United States Patent
Belkhiri et al.

(10) Patent No.: US 9,827,929 B2
(45) Date of Patent: Nov. 28, 2017

(54) METHOD FOR MANAGING A SYSTEM FOR SUPPLYING A VEHICLE ELECTRICAL SYSTEM WITH ELECTRICAL ENERGY

(71) Applicant: Technoboost, Paris (FR)

(72) Inventors: Abdeslam Belkhiri, Clichy (FR); Serge Da Cruz Pereira, Saint Ouen l'Aumône (FR); Bernard Boucly, Le Chesnay (FR)

(73) Assignee: TECHNOBOOST, Paris (FR)

( * ) Notice: Subject to any disclaimer, the term of this patent is extended or adjusted under 35 U.S.C. 154(b) by 322 days.

(21) Appl. No.: 14/434,978

(22) PCT Filed: Sep. 27, 2013

(86) PCT No.: PCT/FR2013/052287
§ 371 (c)(1),
(2) Date: Apr. 10, 2015

(87) PCT Pub. No.: WO2014/080098
PCT Pub. Date: May 30, 2014

(65) Prior Publication Data
US 2015/0258949 A1    Sep. 17, 2015

(30) Foreign Application Priority Data

Oct. 10, 2012  (FR) ..................... 12 59670

(51) Int. Cl.
*B60L 11/04* (2006.01)
*B60R 16/033* (2006.01)
(Continued)

(52) U.S. Cl.
CPC .......... *B60R 16/033* (2013.01); *B60L 11/005* (2013.01); *B60L 11/04* (2013.01);
(Continued)

(58) Field of Classification Search
CPC .... B60R 16/033; B60L 11/04; B60L 11/1868; B60L 11/005; B60L 2240/547;
(Continued)

(56) References Cited

U.S. PATENT DOCUMENTS 7,419,020 B2 *  9/2008  Pott ......................... B60K 6/28
                                                         180/65.1
9,346,360 B2 *  5/2016  Buchzik .................. B60L 1/003
(Continued)

FOREIGN PATENT DOCUMENTS

DE    102010050125 A1    5/2012
WO    2011057699 A2      5/2011

OTHER PUBLICATIONS

International Search Report of corresponding application PCT/FR2013/052287 dated Nov. 29, 2013.

*Primary Examiner* — Jung Kim
(74) *Attorney, Agent, or Firm* — Polster Lieder Woodruff & Lucchesi, L.C.

(57) ABSTRACT

The invention concerns a method for managing a system for supplying a vehicle electrical system with electrical energy, comprising the steps consisting of: •supplying the electrical system with electrical energy via the additional electrical energy storage device and the DC/DC converter when the switch is open; •regulating the electrical energy generator to supply voltage lower than that imposed by the DC/DC converter and higher than a voltage of the electrical energy storage device; •closing the switch such that the DC/DC converter imposes a voltage on the electrical system that is higher than that of the electrical energy storage device and the electrical energy generator; •applying a voltage to the electrical system from the electrical energy generator that is higher than that of the DC/DC converter; and deactivating the DC/DC converter.

9 Claims, 6 Drawing Sheets

(51) Int. Cl.
*B60L 11/00* (2006.01)
*B60L 11/18* (2006.01)
*H02J 1/08* (2006.01)
*H02J 1/00* (2006.01)

(52) U.S. Cl.
CPC ............ *B60L 11/1868* (2013.01); *H02J 1/08* (2013.01); *B60L 2210/10* (2013.01); *B60L 2240/547* (2013.01); *B60L 2240/549* (2013.01); *H02J 2001/008* (2013.01); *Y02T 10/7005* (2013.01); *Y02T 10/7022* (2013.01); *Y02T 10/7066* (2013.01); *Y02T 10/7216* (2013.01)

(58) Field of Classification Search
CPC .. B60L 2240/549; B60L 2210/10; H02J 1/08; H02J 2001/008; Y02T 10/7005; Y02T 10/7022; Y02T 10/7066; Y02T 10/7216
See application file for complete search history.

(56) References Cited

U.S. PATENT DOCUMENTS

| | | | | |
|---|---|---|---|---|
| 2012/0330538 | A1* | 12/2012 | Spjuth | F02N 11/0866 701/113 |
| 2013/0229049 | A1* | 9/2013 | Larsson | F02N 11/0814 307/9.1 |

\* cited by examiner

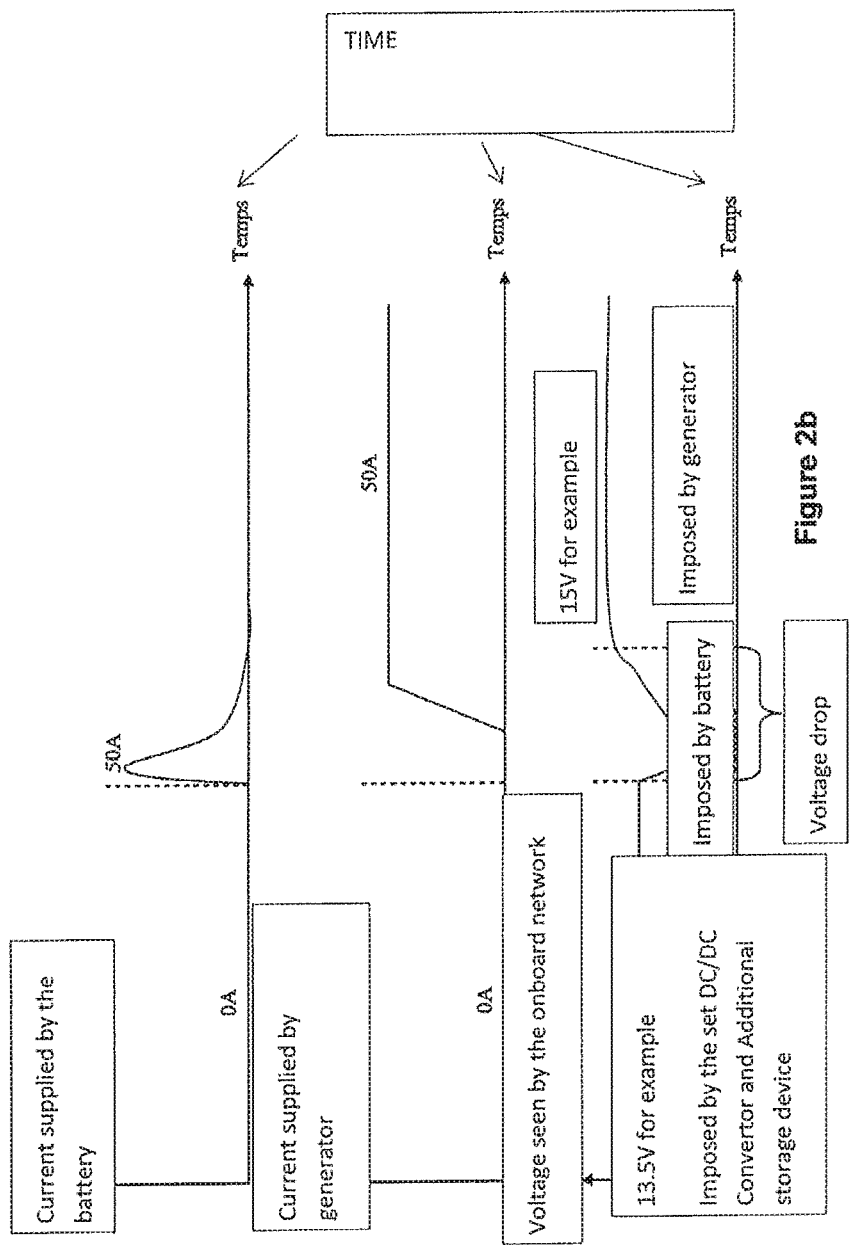

METHOD FOR MANAGING A SYSTEM FOR SUPPLYING A VEHICLE ELECTRICAL SYSTEM WITH ELECTRICAL ENERGY

CROSS-REFERENCE TO RELATED APPLICATIONS

The present invention is the US national stage under 35 U.S.C. §371 of International Application No. PCT/FR2013/052287 which was filed on Sep. 27, 2013 and which claims the priority of French application 1259670 filed Oct. 10, 2012, the content of which (text, drawings and claims) is incorporated herein by reference.

BACKGROUND

The present invention relates generally to a method for managing a system for supplying an onboard network of a vehicle with electrical energy.

FIG. 1 illustrates a known system for supplying an onboard network of a vehicle with electrical energy. The system 1 comprises a generator 3 (for example, an alternator, a starter-alternator or a DC/DC converter (DC/DC)), an electrical energy storage device 5 such as a 12V battery, an onboard network 7 including all the electrical and electronic components of the vehicle, a set 9 including a switch K and a DC/DC converter 11, and an additional electrical energy storage device 13 which is connected to the set 9 and the DC/DC convertor 11.

The operation of the system 1 can be divided into two phases:

Phase 1: Switch K (MOS, electromechanical relay, diode) is closed. The generator 3 is driven by a vehicle heat engine and generates electric energy. This electrical energy allows recharging battery 5, powering all the electrical and electronic components of the onboard network 7 and charging the additional storage device 13 via the DC/DC integrated converter 11 integrated in set 9.

Phase 2: Switch K is open. Generator 3 and battery 5 are isolated from other organs by switch K. Generator 3 can be driven and produce electrical energy to recharge the battery 5 or be stopped and therefore the battery 5 imposes its voltage to the terminals of generator 3. The DC/DC converter 11 of set 9 and 13 allow the additional storage device to provide electrical power to the onboard network 7 while ensuring satisfactory voltage for the onboard network needs (e.g. 13.5V). Then when the additional storage device 13 no longer has enough energy, the set 9 integrated DC/DC converter 11 stops working, switch K is closed and the generator 3 and the battery 5 become the main energy source for the onboard network.

These two phases are repeated periodically.

However, during the transition from phase 2 to phase 1, stopping the DC/DC converter 11 of the set 9 can generate a voltage drop seen by the onboard network 7 causing, for example, a decrease of intensity of the lights or a reset some vehicle computers. This is illustrated in FIGS. 2A and 2B.

For example, let us assume that the onboard network represents a power consumption of 50A.

Switch K is open, thus isolating the generator and the battery 5 and the DC/DC converter 11 of the additional storage device 13 and the onboard network.

When the generator 3 is stopped, the voltage of the battery 5 is imposed on the generator terminals 3. The DC/DC converter 11 and the additional storage device 13 provide 50A to the onboard network 7 while regulating the voltage across the board network (e.g. 13.5V).

When the DC/DC converter 11 stops operating, the switch K is closed, and the consumption of the onboard network 7 is therefore directly imposed on the generator 3 and battery 5. The generator 3 and battery 5 see this 50A consumption imposed as a high current draw. Battery 5 temporarily provides this energy requirement to the network 7 before the generator 3 resumes out and becomes the main energy source. During the supply of power from the battery 5 following the stop of the DC/DC converter 11, a voltage drop may be imposed on the onboard network 7 (FIG. 2B).

This voltage drop could deprive a safe function of the vehicle of energy.

BRIEF SUMMARY

An object of the present invention is to address the disadvantages mentioned above and particularly to propose a method for managing the power supply system of a vehicle with electrical energy for providing a stable voltage which does not impede any safe function of the vehicle.

For this purpose a first aspect of the invention relates to a method of managing a system for supplying an onboard network of a vehicle in electrical energy, the system comprising:

An onboard network including electrical or electronic elements of the vehicle;

A storage device of electric power;

An electrical energy generator connected to the electric energy storage device;

An additional electrical energy storage device; and

An onboard set comprising a switch and a DC/DC converter, the set being connected to the electrical energy storage device, the power generator and the of the onboard network when the switch is closed, and connected to the additional electric power storage device and the onboard network when the switch is open;

A particularly advantageous application consists in the fact that the voltage of the electric power generator is gradually increased.

Advantageously, during the step of applying a voltage of the power generator superior to that of the DC/DC converter, the voltage of the DC/DC converter is decreased to go below that the electric power generator.

Advantageously, the voltage of the DC/DC converter is gradually reduced.

Very advantageously, in the step of supplying the onboard network with electrical energy through the additional electrical energy storage device and the DC/DC converter when the switch is open, the generator of electric power is shut down and restarted during the step of controlling the electric power generator for supplying a voltage less than that imposed by the DC/DC converter and higher than the voltage of the electric energy storage device.

Very advantageously, during the step of feeding the onboard network with electrical energy via the additional electrical energy storage device and the DC/DC converter when the switch is open, the generator of electric power is activated and regulated to provide a lower voltage than that imposed by the DC/DC converter.

Very advantageously, the electric power generator is controlled to provide a voltage lower than that imposed by the DC/DC converter and higher than a voltage of the electric energy storage device when the level of discharge of the additional storage device of electric energy reaches a predetermined value.

According to a second aspect, the present invention relates to a system for supplying an onboard network of a vehicle into electrical energy comprising:

An onboard network including electrical or electronic elements of the vehicle;

A storage device of electric power;

An electrical energy generator connected to the storage device of electrical energy;

An additional electrical energy storage device;

A set comprising a switch and a DC/DC converter, the set being connected to the electrical energy storage device, the power generator and the onboard network in a manner to supply electrical power to the onboard network through the electric power generator when the switch is closed, and connected to additional electrical energy storage device and to the onboard network in a manner to supply the electrical system with electrical energy by means of the additional electrical energy storage device and of the DC/DC converter when the switch is open;

Characterized in that it further comprises a controller configured to regulate the electric power generator for supplying a voltage less than that imposed by the DC/DC converter and a voltage higher than that of the energy storage device when the switch is open, and for applying to the onboard network a voltage of the power generator superior to the DC/DC converter when the switch is closed.

According to a third aspect, the present invention relates to a motor vehicle comprising the system as defined above.

BRIEF DESCRIPTION OF THE FIGURES

Other features and advantages of the present invention will become more apparent upon reading the following detailed description of an application mode of the invention given by way of non-limiting example and illustrated in the accompanying drawings, in which:

FIGS. 2A and 2B illustrate a voltage drop seen by the vehicle electrical system due to the deactivation of the DC/DC converter of the system shown in FIG. 1;

DESCRIPTION

Figure 1:
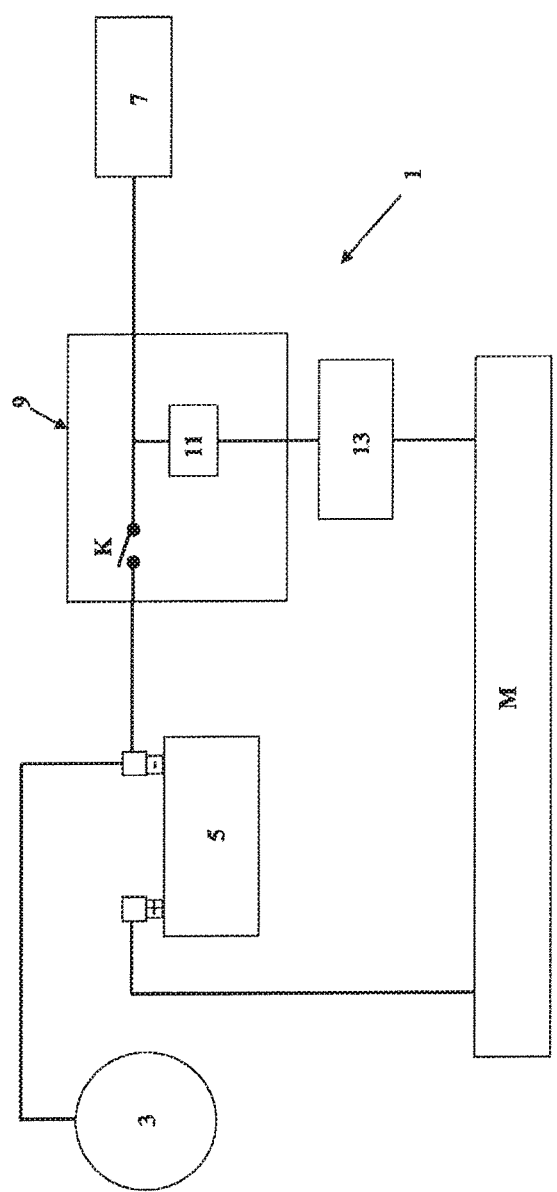
FIG. 1 shows a system of the prior art for supplying an onboard network of a vehicle with electric power.
Figure 2A:
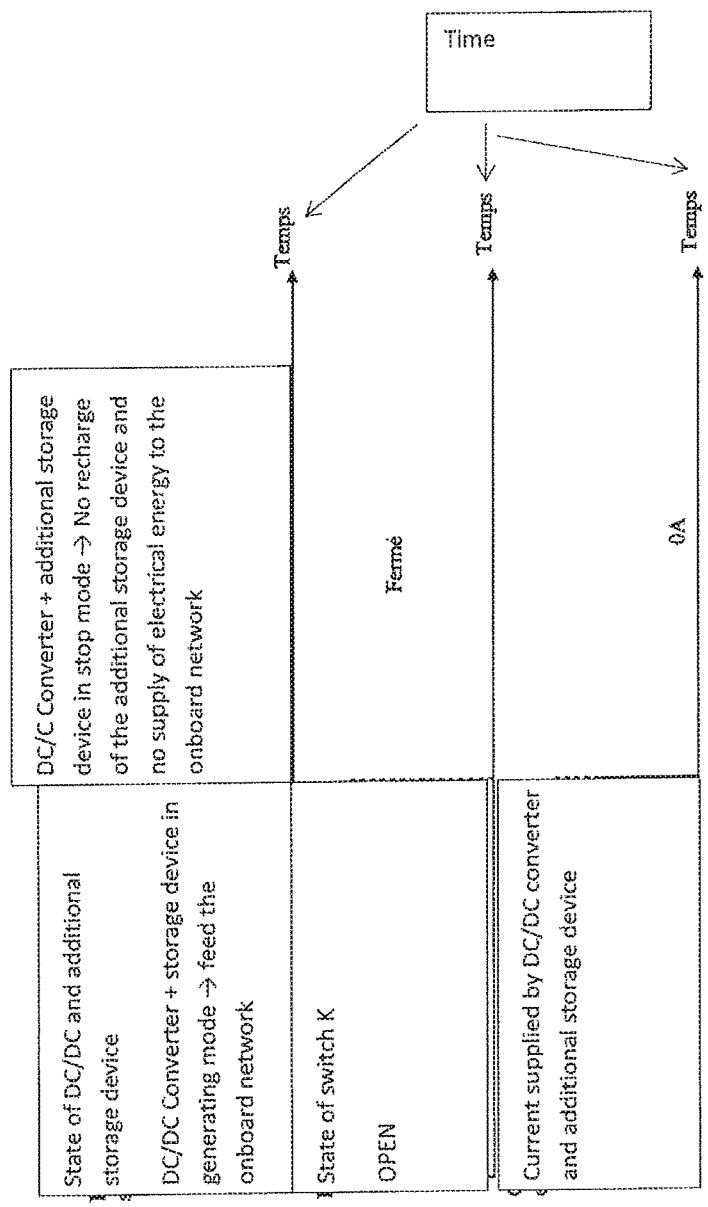
Figure 3:
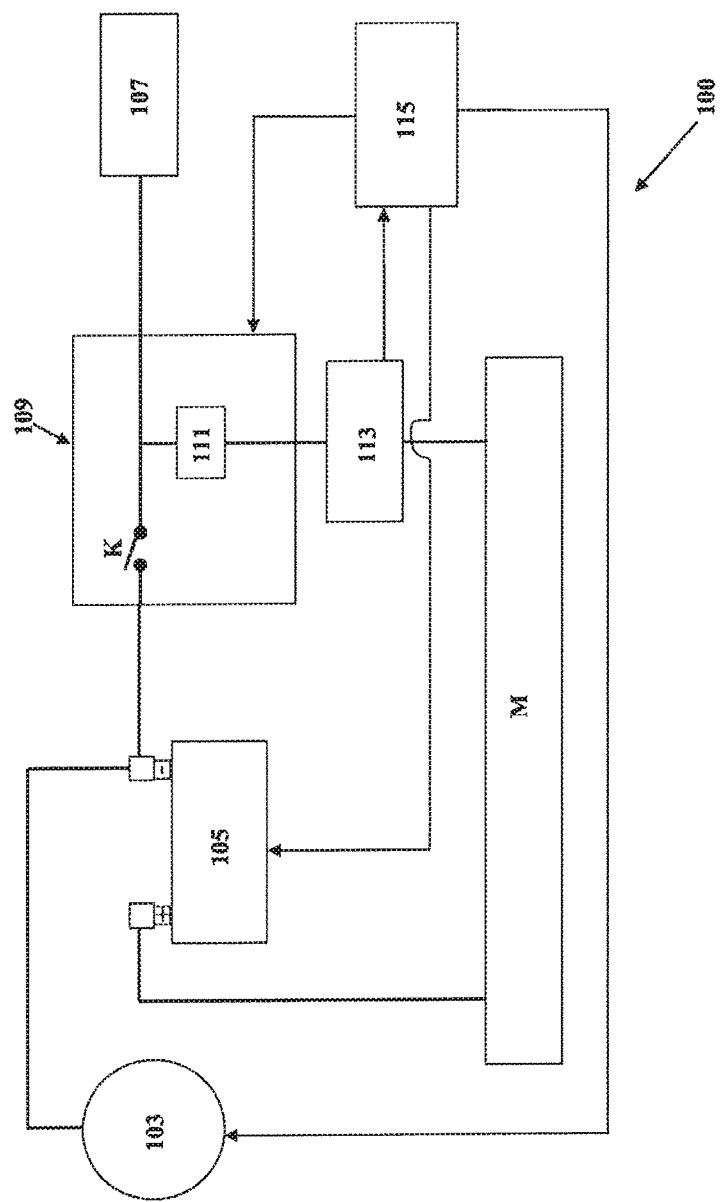
FIG. 3 illustrates a system for supplying an onboard network of a vehicle with electric energy according to the present invention; 10

FIG. 3 illustrates a system 100 for supplying an onboard network of a vehicle with electric energy according to the present invention. The system 100 comprises an electric power generator 103 such as an alternator, a starter-alternator, or a DC/DC converter (for example, a converter DC/DC or a voltage converter), an electrical energy storage device 105 such as an electrochemical battery (12V for example), an onboard network 107 including electrical or electronic elements of the vehicle, a set 109 comprising a switch K and a DC/DC converter (DC/DC) 111 (e.g. a DC/DC current converter or a DC voltage converter), an additional electrical energy storage device 113 such as a super-capacitor or a battery and a control device 115.

The power generator 103 is connected to the negative terminal of the battery 105 and the positive terminal of the battery 105 is connected to the grounding device M. The switch K is electrically connected on one side to the negative terminal of the battery 105 (and the power generator 103) and on the other side in series 5 with the onboard network 107. The DC/DC converter 111 is electrically connected between one side and the switch K of network 107 and it is electrically connected across the additional electrical energy storage device 113. The additional electrical energy storage device 113 is also electrically connected to the grounding device M. The control device 115 is connected to the set 109, to the electric power generator 103, to the storage device of electrical energy storage 105 and the additional electrical energy storage device 113.

The switch K can be, for example, a MOS switch, an electromechanical relay or a diode.

The power generator 103 can, for example, be driven by an engine of the vehicle to generate electrical energy. This electrical energy allows recharging the electric energy storage device 105, to supply all electrical and electronic organs of the onboard network 107 and recharging additional storage device 113 via the DC/DC converter 111.

The control device 115 is adapted to close the switch K for feeding the onboard network 107 into electrical energy via the electrical energy storage device 105 or the electric power generator 103 and to reload the storage device 113. The control device 115 is also able to enable and disable the DC/DC converter 111 and to open switch K to power the onboard network 107 into electrical energy through the additional electrical energy storage device 113 and the DC/DC converter 111.

The control device 115 is further configured to receive—from the additional storage device 113—a discharge level value of the additional storage device 113 and a voltage value applied by the DC/DC converter 111 to the 107 network. It is further configured to receive from the electrical energy storage device 105 a voltage value supplied by the electrical energy storage device 105.

It is further configured to regulate the electric power generator 103 for supplying a voltage less than that imposed by the DC/DC converter 111 and higher than a voltage of the electrical energy storage device 105 when the switch K is opened.

It is configured to regulate the electric power generator 103 for supplying such a voltage level when the discharge of the additional storage device 113 reaches a predetermined value, e.g., 85%, or 90% or 95%.

The control device 115 is further configured to insure the application on the onboard network of a voltage of the electric power generator 103 higher than the DC/DC converter 111 when the switch K is closed.

The control device 115 is further configured to gradually increase the voltage of the electric power generator 103 to exceed that of the DC/DC converter 111, and gradually decrease the voltage of DC/DC converter 111 to fall below that of the electric power generator 103.

Figure 4A:
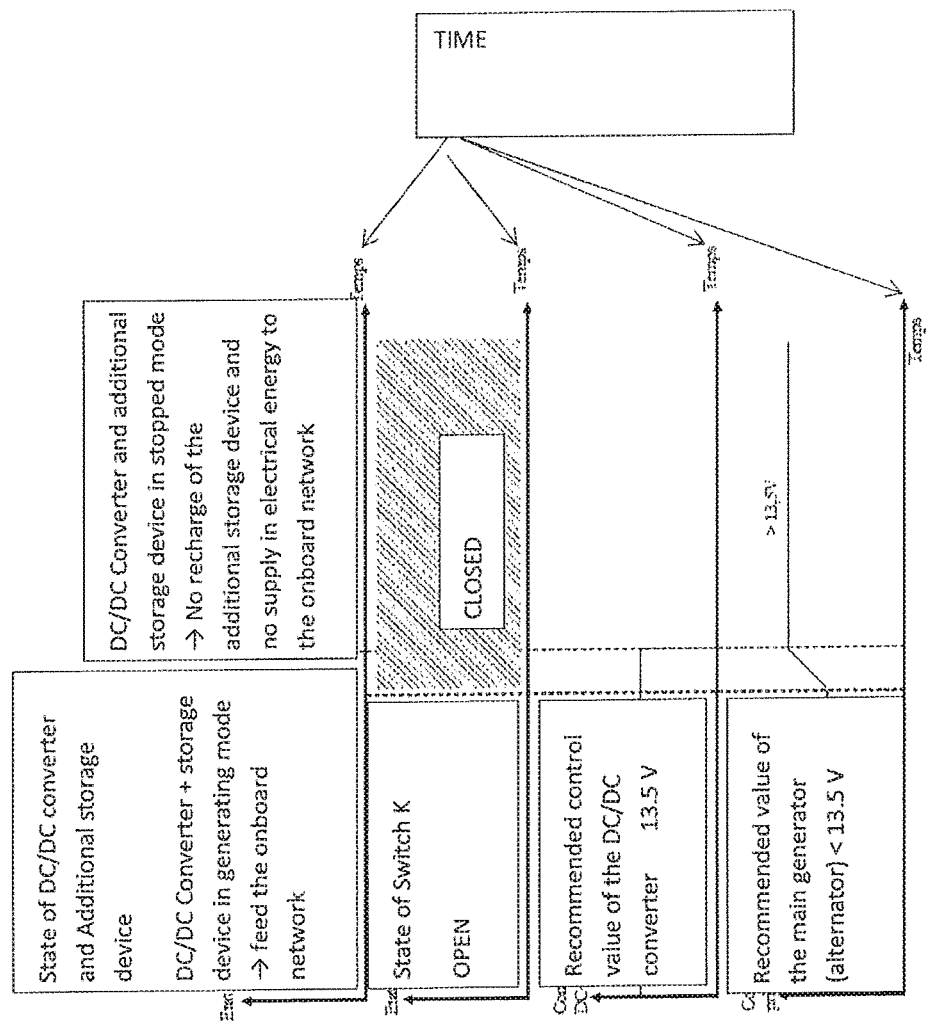
FIGS. 4A and 4B illustrate the improvement provided by the system for supplying an onboard network of a vehicle with electric power of the present invention and of the system management method.
Figure 4B:
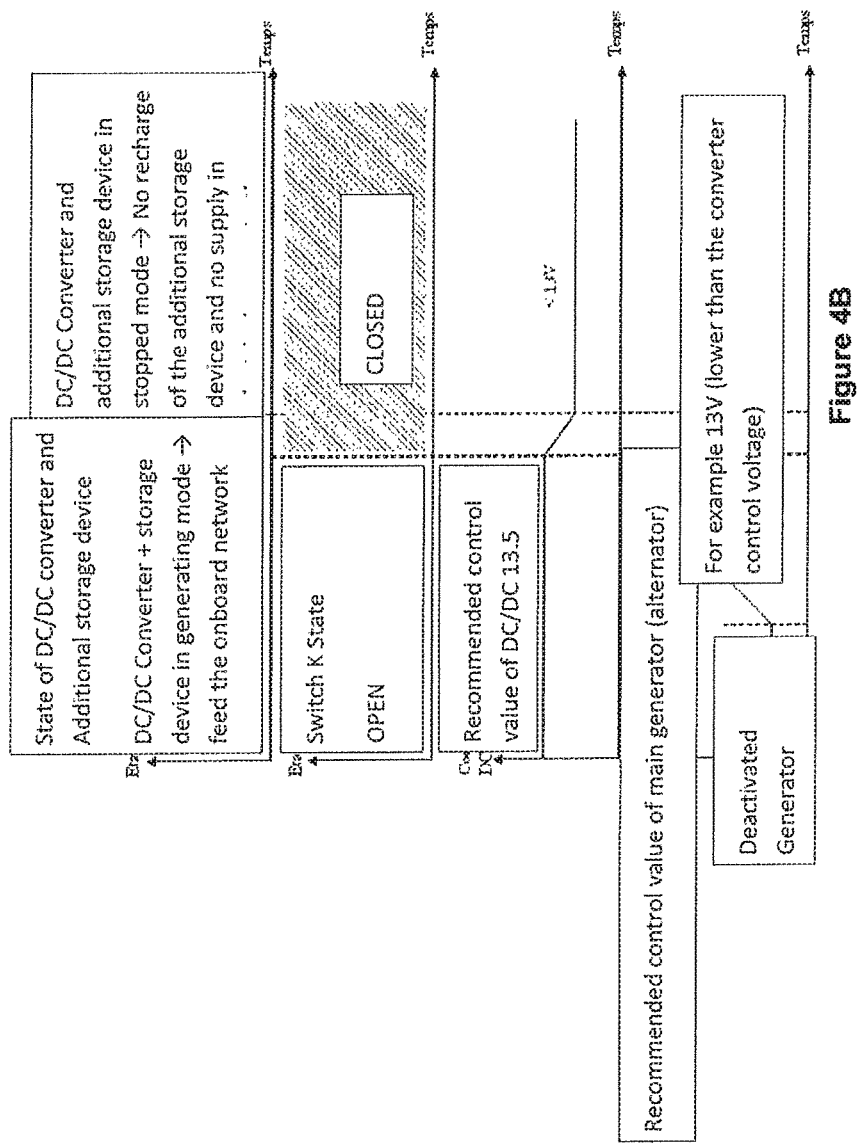

A system management method 100 according to the present invention will now be described (FIGS. 4A and 4B).

During Phase 2 (described above), switch K is set in the open position and the electric power generator 103 and the storage device of electric power 105 are isolated from other organs by the switch K.

The electric power generator 103 is driven to produce a voltage lower than the DC/DC converter 111, or is stopped.

The DC/DC converter 111 of the set 109 and the additional storage device 113 providing electrical energy to the onboard network 107 while guaranteeing a satisfactory voltage of the onboard network to fulfill the needs of the onboard network (e.g. 13.5V).

When one wants to use the electric power generator 103 or 105 or the electrical energy storage device to provide power to the onboard network 107 or when the discharge level of the additional storage device 113 reaches a predetermined value, such as 85% or 90% or 95%, the switch K is kept in an open position, the electric power generator 103 is activated if necessary, and is controlled to provide a voltage lower than that imposed to the onboard network 107 by the DC/DC converter 111 and higher than the voltage of the electrical energy storage device 105.

The switch K is then closed and the DC/DC convertor 111 imposes its voltage to the onboard network 107 because this voltage is higher than that of the electrical energy storage device 105 and that produced by the power generator 103.

A voltage of the electric power generator 103 higher than that of the DC/DC convertor 111 is then applied to the onboard network 107, for example, by increasing the voltage of the power generator 103 to exceed the voltage of the DC/DC converter 111 or by decreasing the voltage of the DC/DC converter 111 to fall below that of the electric power generator 103. The power generator 103 becomes the main energy source for the board network 107.

The DC/DC converter 111 can be turned off when the voltage of the electric power generator 103 becomes higher than that of the DC/DC converter 111. The additional storage device 113 provides more energy to the onboard network 107.

The voltage of the electric power generator 103 is, for example, gradually increased and the voltage of the DC/DC converter is, for example, gradually decreased.

With the present invention, the voltage drop imposed on the onboard network and due to the deactivation of the DC/DC converter is removed so that the quality of the onboard network is improved, a stable voltage is always supplied to the onboard network and continuous operation of vehicle safety functions is assured.

It will be understood that various modifications and/or improvements obvious to those skilled in the art can be made to the different applications of the invention described herein without departing from the scope of the invention defined by the appended claims.

The invention claimed is:

1. A method of managing a system for supplying an onboard network of a vehicle with electric power, the system comprising:
   an onboard network having a plurality of electric elements or an electronic system,
   an electrical energy storage device,
   an electrical energy generator connected to the electrical energy storage device,
   an additional electrical energy storage device, and
   a set comprising a switch and a DC/DC converter, the set being connected to the electrical energy storage device, the electric power generator and the onboard network when the switch is closed, and connected to the additional electrical energy storage device and the onboard network when the switch is open,
the method comprising:
   supplying electrical energy to the onboard network through the additional electrical energy storage device and the DC/DC converter when the switch is open,
   controlling the electric power generator to provide a voltage lower than that imposed by the DC/DC converter and higher than that imposed by the electric energy storage device,
   closing the switch in order for the DC/DC converter to impose a voltage to the onboard network greater than that of the electrical energy storage device and the electric power generator,
   applying to the onboard network a voltage from the electric power generator greater than that of the DC/DC converter in order to power the onboard network with electrical power through the electric power generator, and
   disabling the DC/DC converter.

2. A method according to claim 1, wherein when applying a voltage from the electric power generator greater than that of the DC/DC converter, the voltage of the electric power generator is increased to exceed that of the DC/DC converter.

3. A method according to claim 2, wherein the voltage of the electric power generator is increased gradually.

4. A method according to claim 1, wherein when applying a voltage from the electric power generator greater than that of the DC/DC converter, the voltage of the DC/DC converter is decreased to fall below that of the electric power generator.

5. A method according to claim 4, wherein the voltage of the DC/DC converter is decreased gradually.

6. A method according to claim 1, wherein when supplying electrical energy to the on-board network via the additional electrical energy storage device and DC/DC converter, when the switch is opened, the electric power generator is deactivated and reactivated when controlling the electric power generator for providing a voltage lower than that imposed by the DC/DC converter and higher than a voltage of the electric energy storage device.

7. A method according to claim 1 wherein when supplying electrical energy to the onboard network via the additional electrical energy storage device and the DC/DC converter, when the switch is opened, the electric power generator is activated and controlled to provide a voltage lower than that imposed by the DC/DC converter.

8. A method according to claim 1 wherein the electric power generator is controlled to provide a voltage lower than that imposed by the DC/DC converter and higher than a voltage of the electric energy storage device when the discharge level of the additional electrical energy storage device reaches a predetermined value.

9. A system for supplying an onboard network of a vehicle with electrical energy comprising:
   an onboard network including electric or electronic elements of the vehicle,
   an electrical energy storage device,
   an electrical energy generator connected to the electrical energy storage device,
   an additional electrical energy storage device,
   a set comprising a switch and a DC/DC converter, the set being connected to the electrical energy storage device, the electric power generator and the network in a manner configured to supply the onboard network with electrical power through the electrical power generator when the switch is closed, and connected to the additional electrical energy storage device and the network in a way to feed the onboard network with electrical energy by means of the additional electrical energy storage device and DC/DC converter when the switch is open, and
   a control device configured to regulate the electric power generator to provide a voltage lower than that imposed by the DC/DC converter and greater than the voltage of the electric energy storage device when the switch is opened, and configured for applying to the network a voltage of the electric power generator greater than that of the DC/DC converter when the switch is closed.

* * * * *